United States Patent [19]

Cragun

[11] Patent Number: 6,091,416
[45] Date of Patent: Jul. 18, 2000

[54] METHOD, APPARATUS AND COMPUTER PROGRAM PRODUCT FOR GRAPHICAL USER INTERFACE CONTROL AND GENERATING A MULTITOOL ICON

[75] Inventor: Brian J. Cragun, Rochester, Minn.

[73] Assignee: International Business Machines Corporation, Armonk, N.Y.

[21] Appl. No.: 08/939,902

[22] Filed: Sep. 29, 1997

[51] Int. Cl.[7] .................................................. G06F 3/00
[52] U.S. Cl. ........................ 345/348; 345/349; 345/354; 345/145; 345/333; 345/339
[58] Field of Search .................... 345/348, 349, 345/352, 354, 145, 157, 339, 333, 334

[56] References Cited

U.S. PATENT DOCUMENTS

| | | | |
|---|---|---|---|
| 5,163,130 | 11/1992 | Hullot | 345/334 |
| 5,169,342 | 12/1992 | Steele et al. | 345/146 |
| 5,367,626 | 11/1994 | Morioka et al. | 345/348 |
| 5,506,952 | 4/1996 | Choy et al. | 345/348 |
| 5,555,370 | 9/1996 | Li et al. | 345/334 |
| 5,740,436 | 4/1998 | Davis et al. | 395/651 |
| 5,760,774 | 6/1998 | Grossman et al. | 345/348 |

*Primary Examiner*—Raymond J. Bayerl
*Assistant Examiner*—Cuong T. Thai
*Attorney, Agent, or Firm*—Joan Pennington

[57] ABSTRACT

A method, apparatus and computer program product are provided for graphical user interface control in a computer system. A user selected tool is identified and a multitool icon is built responsive to identifying the user selected tool. A palette map is built and displayed responsive to identifying the user selected tool. Responsive to a predetermined user selection, the multitool icon is displayed within a selected display screen area. A current selected tool is distinguished from other tools within the displayed multitool icon. Responsive to a predetermined user selection, the palette map is displayed in a selected display screen area separated from a tool box menu display. The current selected tool is distinguished from other tools within the displayed palette map.

19 Claims, 17 Drawing Sheets

TOOL BOX LIST 118A

| | TOOL ID 302 | BITMAP POINTER 304 | METHOD POINTER 306 | SELECTED 308 |
|---|---|---|---|---|
| INDEX 310 | | | | |
| 0 | T-SELECTOR | [ADDRESS] | [ADDRESS] | FALSE |
| 1 | T-PENCIL | [ADDRESS] | [ADDRESS] | TRUE |
| 2 | T-SPRAY | [ADDRESS] | [ADDRESS] | TRUE |
| 3 | T-ERASER | [ADDRESS] | [ADDRESS] | TRUE |
| 4 | T-BRUSH | [ADDRESS] | [ADDRESS] | FALSE |
| 5 | T-LINE | " | " | FALSE |
| 6 | T-CIRCLE | " | " | FALSE |
| 7 | T-REC | " | " | FALSE |

METHOD, APPARATUS AND COMPUTER PROGRAM PRODUCT FOR GRAPHICAL USER INTERFACE CONTROL AND GENERATING A MULTITOOL ICON

FIELD OF THE INVENTION

The present invention relates to the data processing field, and more particularly, relates to a method, apparatus and computer program product for graphical user interface control in a computer system.

DESCRIPTION OF THE PRIOR ART

In today's computer systems, many known applications or computer software products include multiple user selected tools, such as a line drawing tool, a paint brush, and an eraser. A user operates an input device, typically either a mouse or a keyboard to select a tool, and to move the tool to a work area on the display screen. The user then can use the particular tool. Switching back and forth between tools requires the mouse to be moved over to the tool bar and select a new tool, or sometimes a special keystroke for each different tool is available. This is time consuming, annoying, and hard to remember, respectively.

A need exists for an improved graphical user interface control that efficiently and effectively facilitates user control to selectively access multiple user selected tools.

SUMMARY OF THE INVENTION

A principal object of the present invention is to provide improved method, apparatus and computer program product for graphical user interface control in a computer system. Other important objects of the present invention are to provide such improved method and computer program product substantially without negative effects and that overcome many disadvantages of prior art arrangements.

In brief, a method, apparatus and computer program product are provided for graphical user interface control in a computer system. A user selected tool is identified and a multitool icon is built responsive to identifying the user selected tool. A palette map is built and displayed responsive to identifying the user selected tool.

In accordance with features of the invention, responsive to a predetermined user selection, the multitool icon is displayed within a selected display screen area. A current selected tool is distinguished from other tools within the displayed multitool icon. Responsive to a predetermined user selection, the palette map is displayed in a selected display screen area separated from a tool box menu display. The current selected tool is distinguished from other tools within the displayed palette map.

BRIEF DESCRIPTION OF THE DRAWING

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
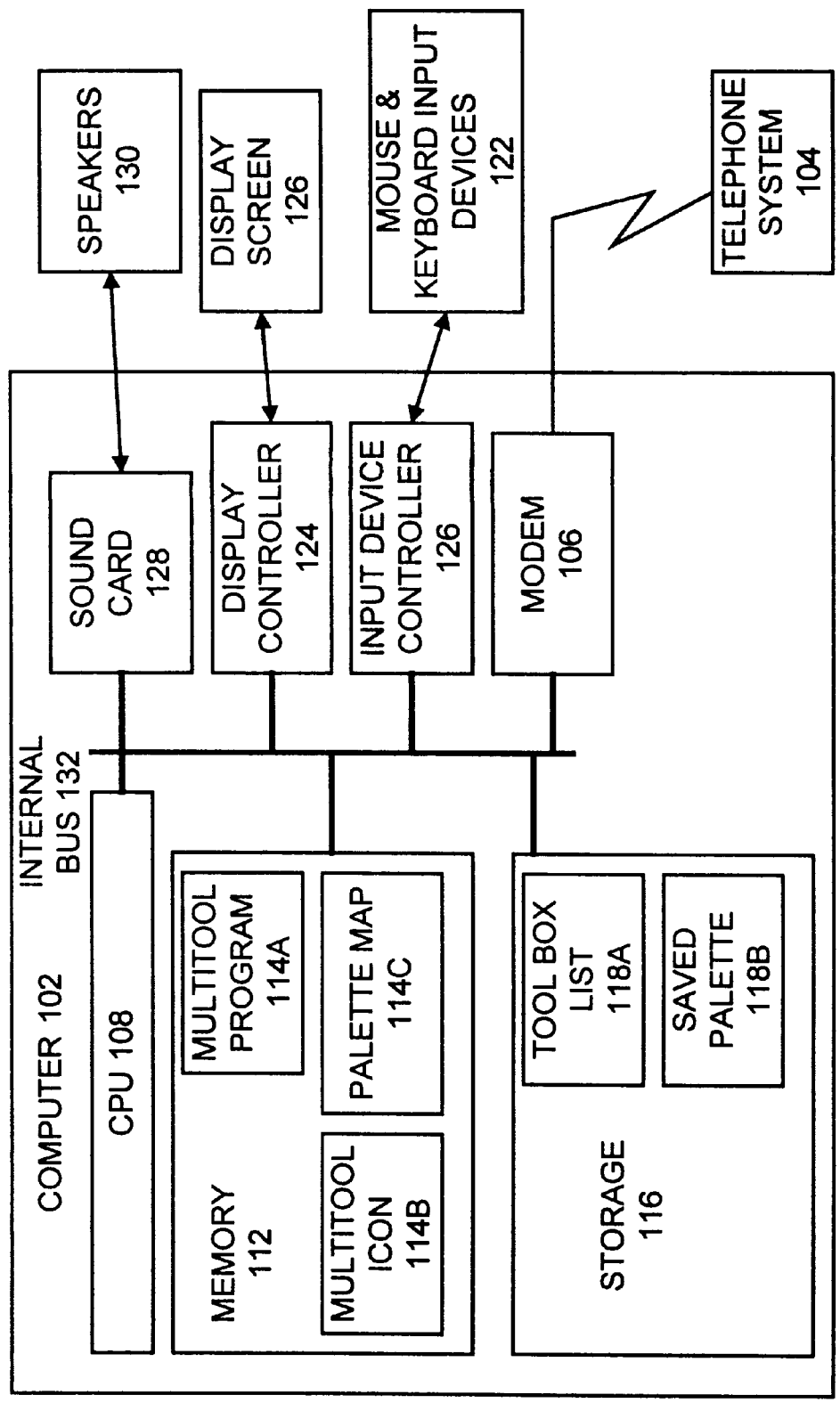
FIG. 1 is a block diagram representation illustrating a computer system for implementing graphical user interface control method, apparatus and computer program product in accordance with the invention.

Having reference now to the drawings, in FIG. 1 there is shown is a block diagram representation illustrating a computer system generally designated by 100 for performing a method and computer program product for graphical user interface control in accordance with the invention. Computer system 100 includes a computer 102 optionally connected to a telephone system 104 via an internal modem 106, as shown. Computer 102 includes a central processing unit (CPU) 108 and a first memory and a second storage respectively designated by 112 and 116. As illustrated, memory 112 stores program and data information including a multitool program 114A for graphical user interface control, a user defined multitool icon 114B, and a palette map 114C of the preferred embodiment. Storage 116 stores a tool box list 118A and a saved palette 118B of the preferred embodiment. The tool box list 118A is illustrated and described with respect to FIG. 3. The saved palette 118B is described with respect to FIG. 4C. Computer 102 includes an input device controller 120 operatively coupled to a mouse and keyboard input devices 122, a display controller 124 operatively coupled to a display screen 126 and a sound card 128 operatively coupled to speakers 130. An internal bus 132 facilitates communications among the components of computer 102.

Various commercially available computers can be used for computer 102 in the computer system 100, for example, an IBM personal computer. CPU 108 is suitably programmed by the multitool program 114A to generate display screens, for example as shown in FIG. 2; and to execute the flowcharts of FIGS. 4A, 4B, 4C, 5, 6, 7A, 7B, 8, 9, 10, 11A, 11B, 12A, and 12B.

Figure 2:
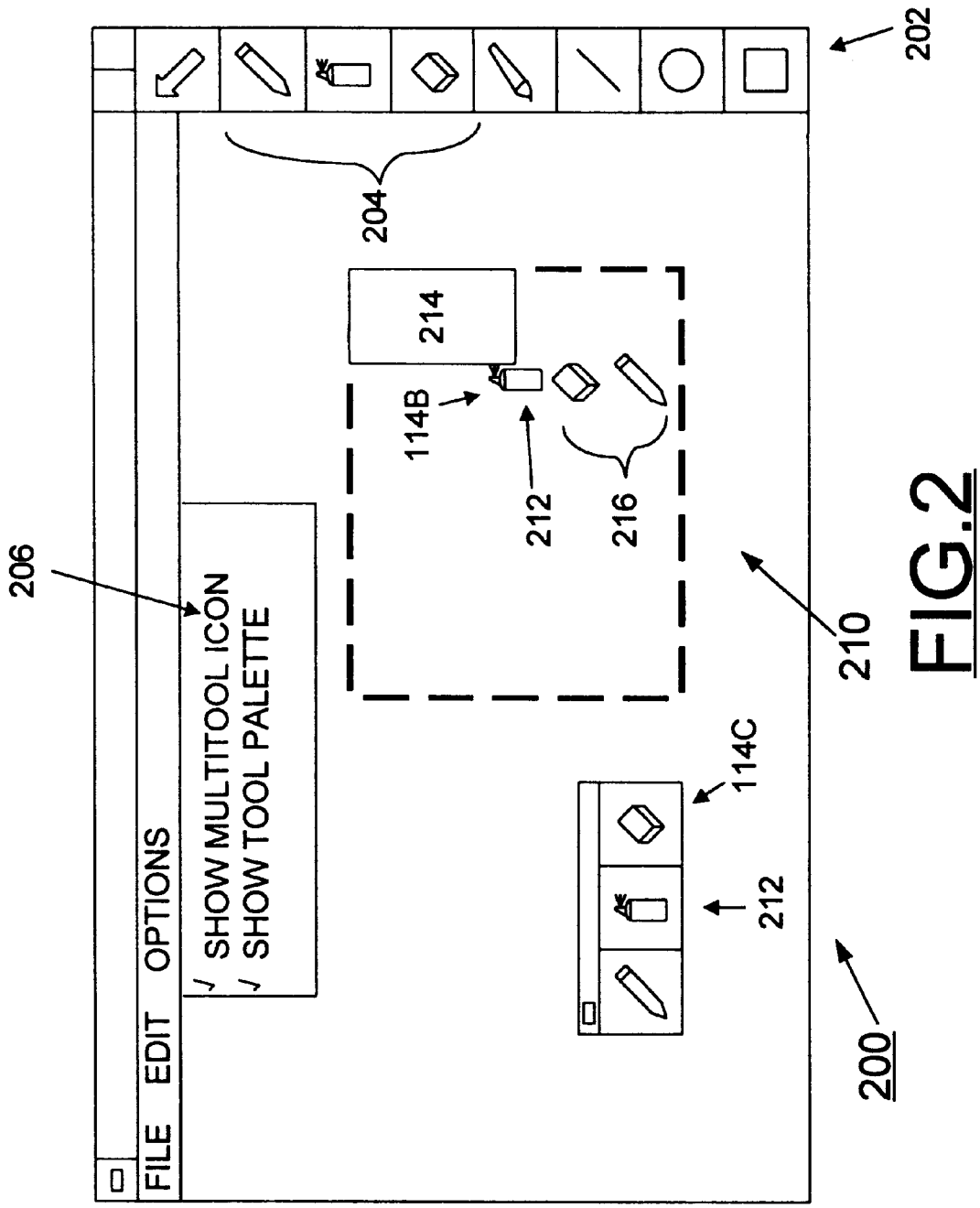
FIG. 2 is an exemplary diagram illustrating a portion of a display screen of the system of FIG. 1 illustrating a graphical user interface in accordance with the invention.

Referring to FIG. 2, there is shown an exemplary screen portion 200 of a display screen 126 to a graphical user interface provided by the multitool program 114A in accordance with the invention. In FIG. 2, multiple user selected tools are available in a tool box 202. In accordance with features of the present invention, the multitool program 114A enables the user to select multiple tools 204 at one time, such as the three illustrated tools 204. A tool palette map 114C is displayed responsive to a user options selection indicated at 206 to show the tool palette. The tool palette map 114C is shown on the display screen portion 200 separated from the tool box 204. The palette map 114C only includes the user selected multiple tools 204. The mouse or the keyboard input device 122 is operated by the user to pick up the user selected multiple tools 204 and move this multiple tool group 204 to a work area 210.

A multitool icon generally designated by 114B representing the user selected multiple tools 204 is built and displayed within the work area 210 by the multitool program 114A. A predefined global keystroke, such as the ctrl-tab key, is operated by the user to switch between tools 204. A currently selected tool 212 of the user selected multiple tools 204 represented by the multitool icon 114B is shown as highlighted next to a current work area 214 within the work area 210. Other non-selected tool icons 216 within a tool group 204 represented by the multitool icon 114B are displayed, for example, with a greyed video effect. The currently selected tool 212 is shown within the multitool icon 114B and tool palette map 114C, for example as highlighted or otherwise denoted. The user selects a particular multiple tool group 204 including, for example a paint-brush, line tool, and eraser, then toggles back and forth between a desired one 212 of the paint-brush, line tool, and eraser by entering the predefined global keystroke, without moving the mouse input device 122 away from the work area 210. Alternatively, a different button or chord on the mouse input device 122 can be used to select a particular tool 212.

Figures 3, 13:
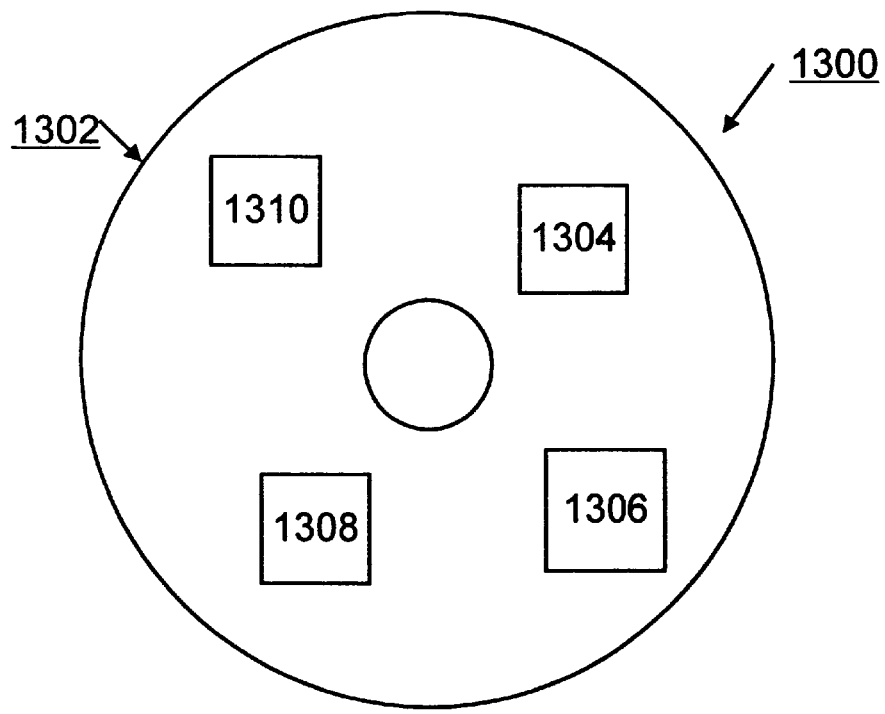
FIG. 3 is a chart illustrating an exemplary tool box list of the preferred embodiment of the system of FIG. 1.
FIG. 13 is a block diagram illustrating a computer program product in accordance with the preferred embodiment.

FIG. 3 is a chart illustrating an exemplary tool box list 118A of the preferred embodiment. The tool box list 118A includes a plurality of tool IDs 302 for each of the available tools. Each tool ID 302 is stored together with a bitmap pointer 304, a method pointer 306, and a selected true or false indicator 308 that indicates a user selection of the particular tool. An index 310 also is associated with each tool ID 302.

Figure 4A:
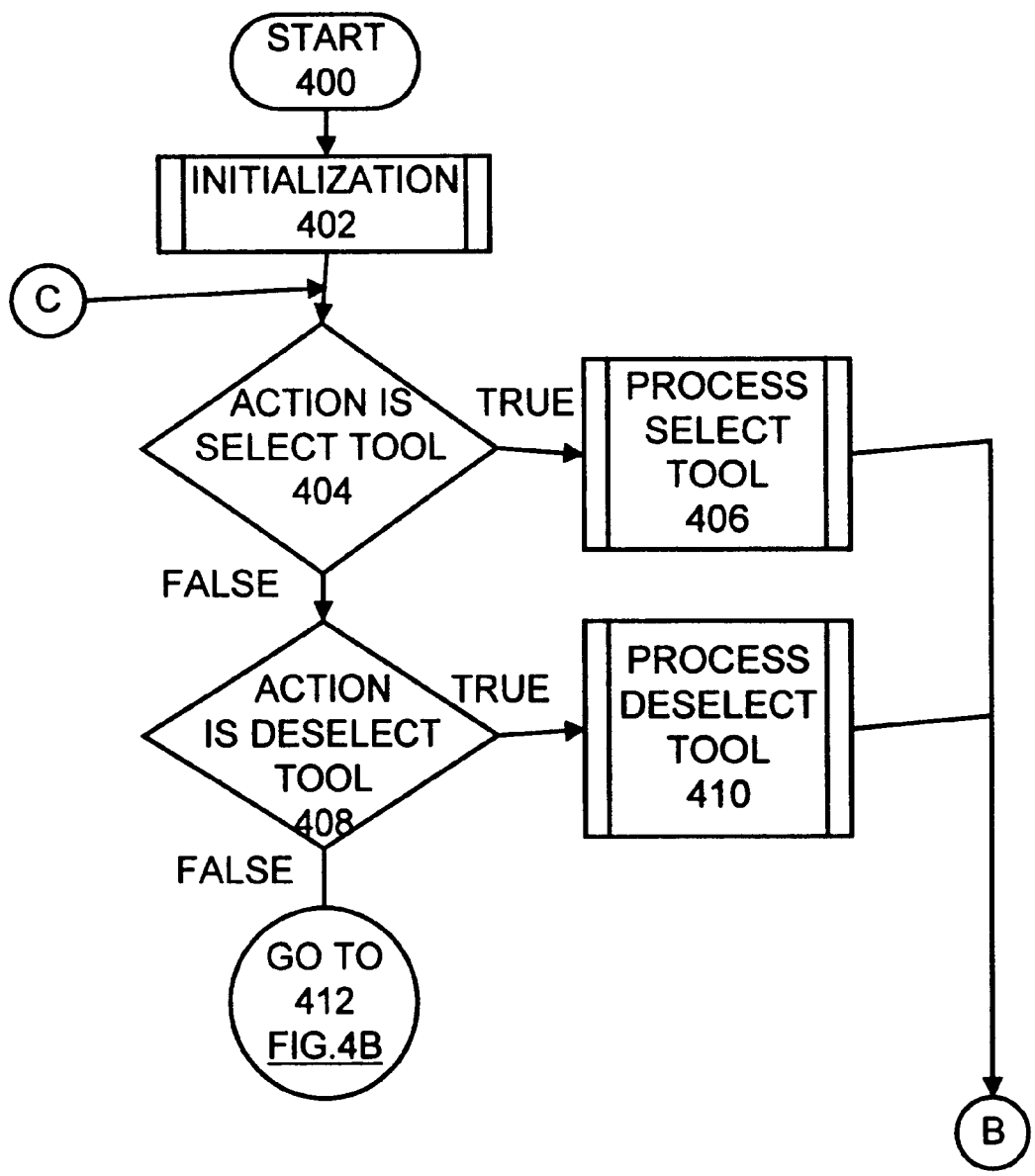
FIGS. 4A, 4B, and 4C together provide a flow chart illustrating startup and tool processing operations in accordance with the method and computer program product of the preferred embodiment.
Figure 4B:
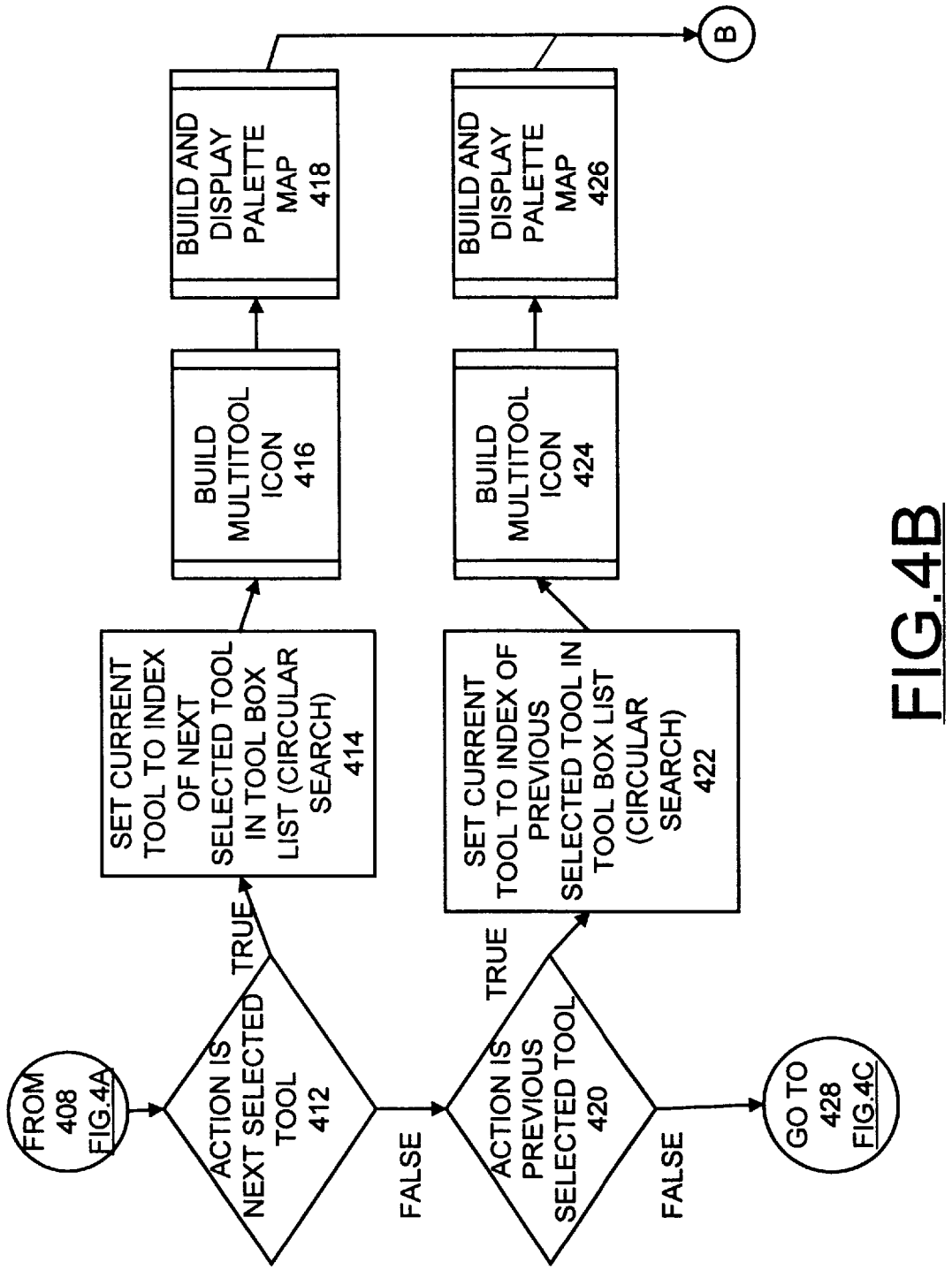
Figure 4C:
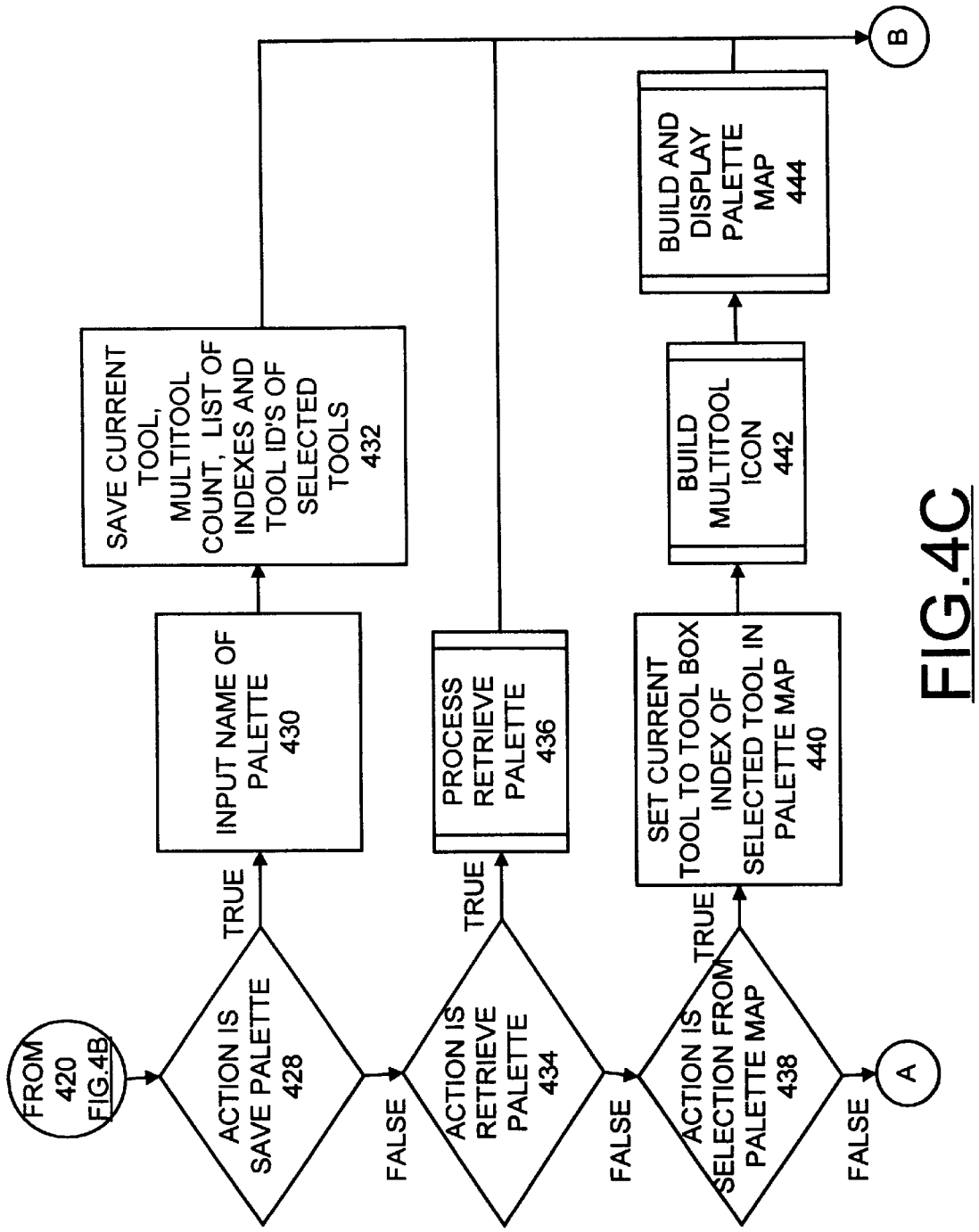
Figure 6:
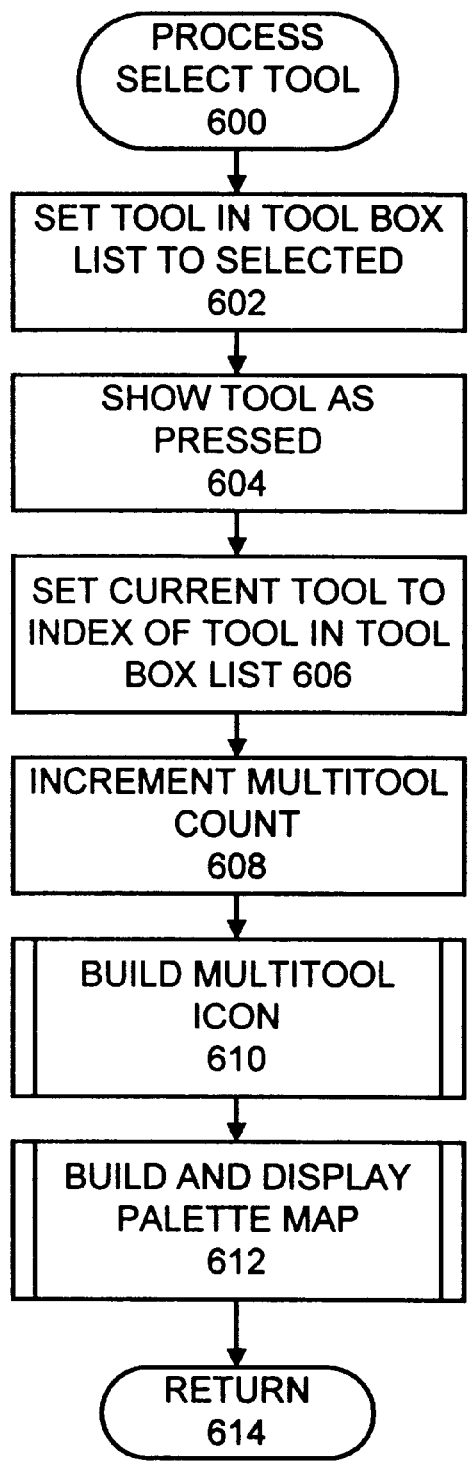
FIG. 6 is a flow chart illustrating sequential operations for a process select tool routine in accordance with the method and computer program product of the preferred embodiment.
Figure 7A:
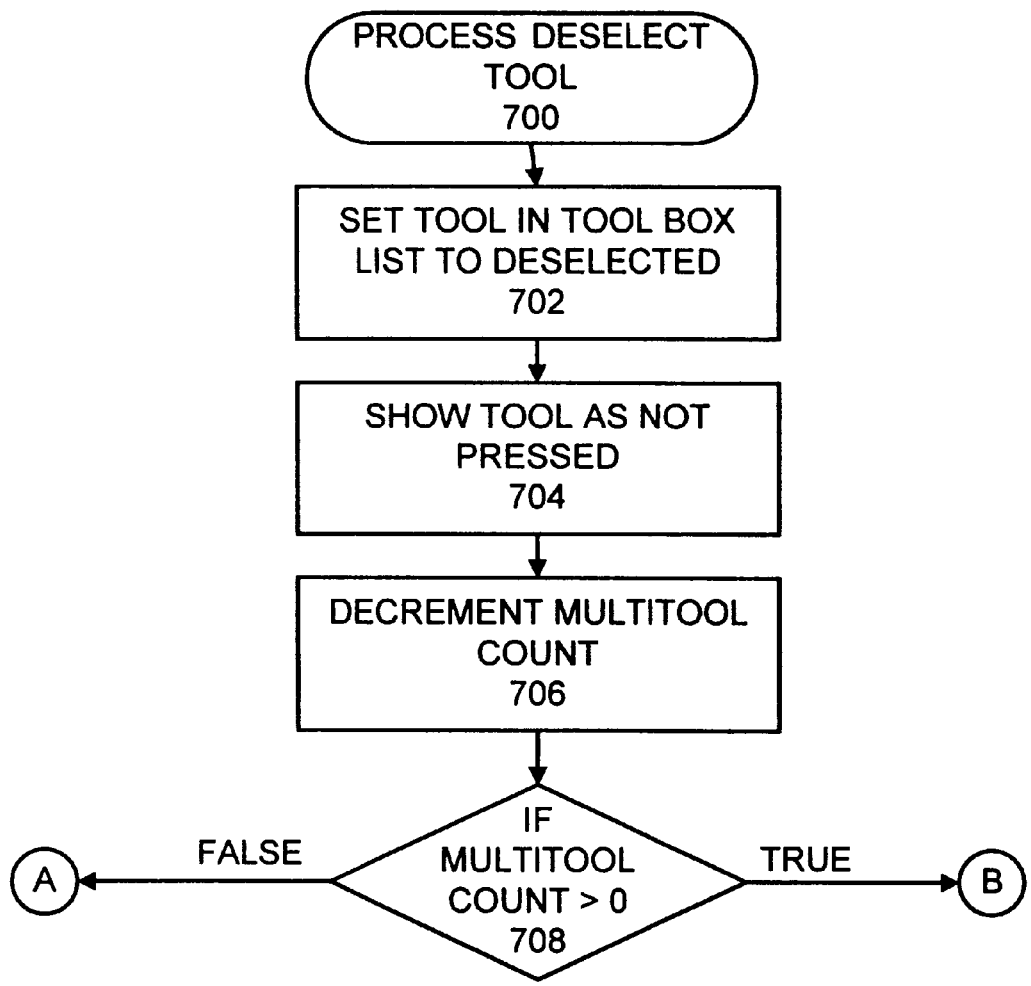
FIGS. 7A and 7B together provide a flow chart illustrating operations for a process deselect tool routine in accordance with the method and computer program product of the preferred embodiment.
Figure 7B:
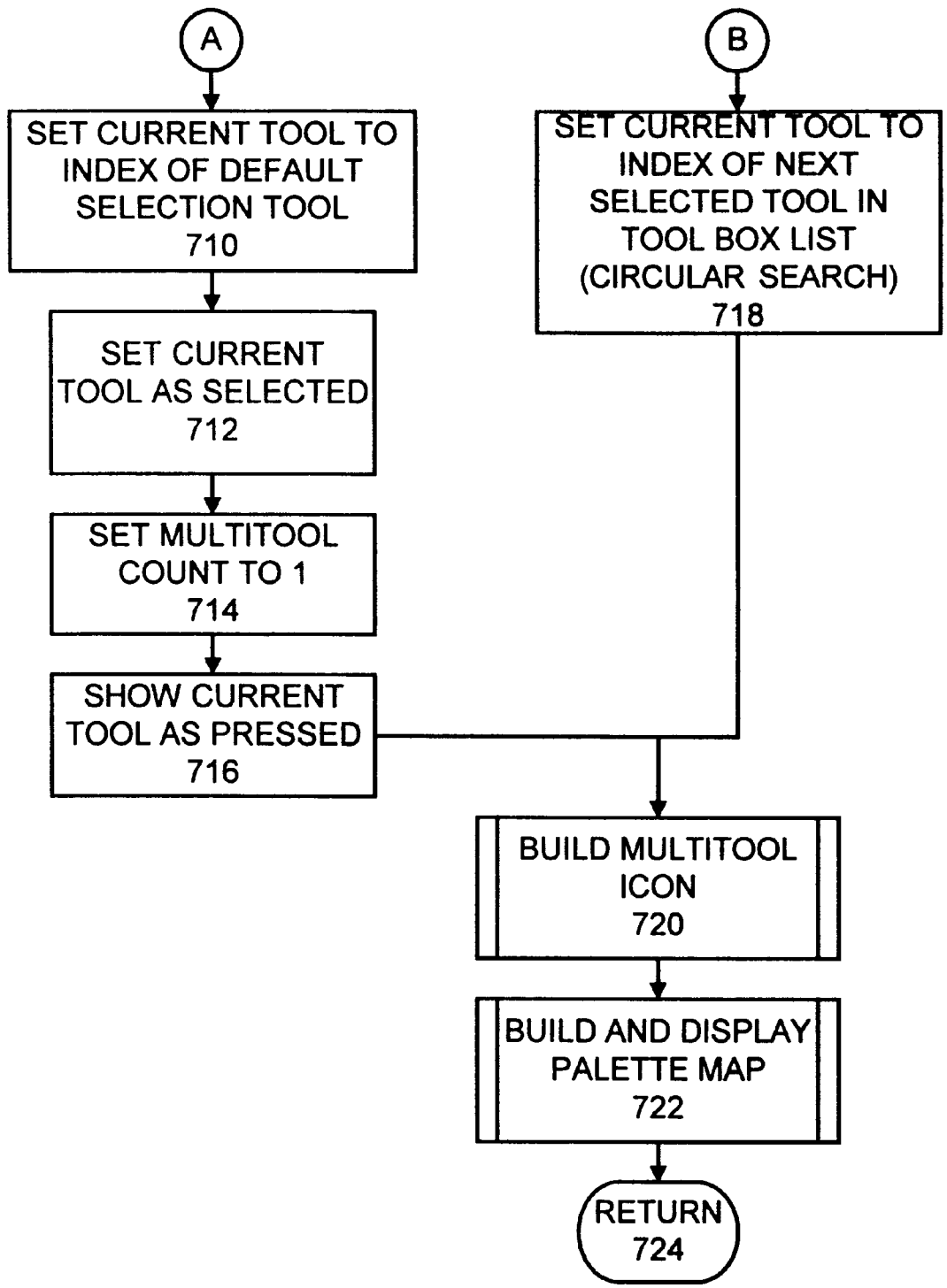

FIGS. 4A, 4B, and 4C together provide a flow chart illustrating startup and tool processing operations in accordance with a method and multitool program 114A of the preferred embodiment. The sequential operations starting at block 400 begin with an initialization routine as indicated at a block 402. A user selected select tool action is identified as indicated at a decision block 404. A process select tool routine illustrated and described with respect to FIG. 6, is performed as indicated at a block 406. A user selected deselect tool action is identified as indicated at a decision block 408. A process deselect tool routine illustrated and described with respect to FIGS. 7A and 7B, is performed as indicated at a block 410.

Figure 11A:
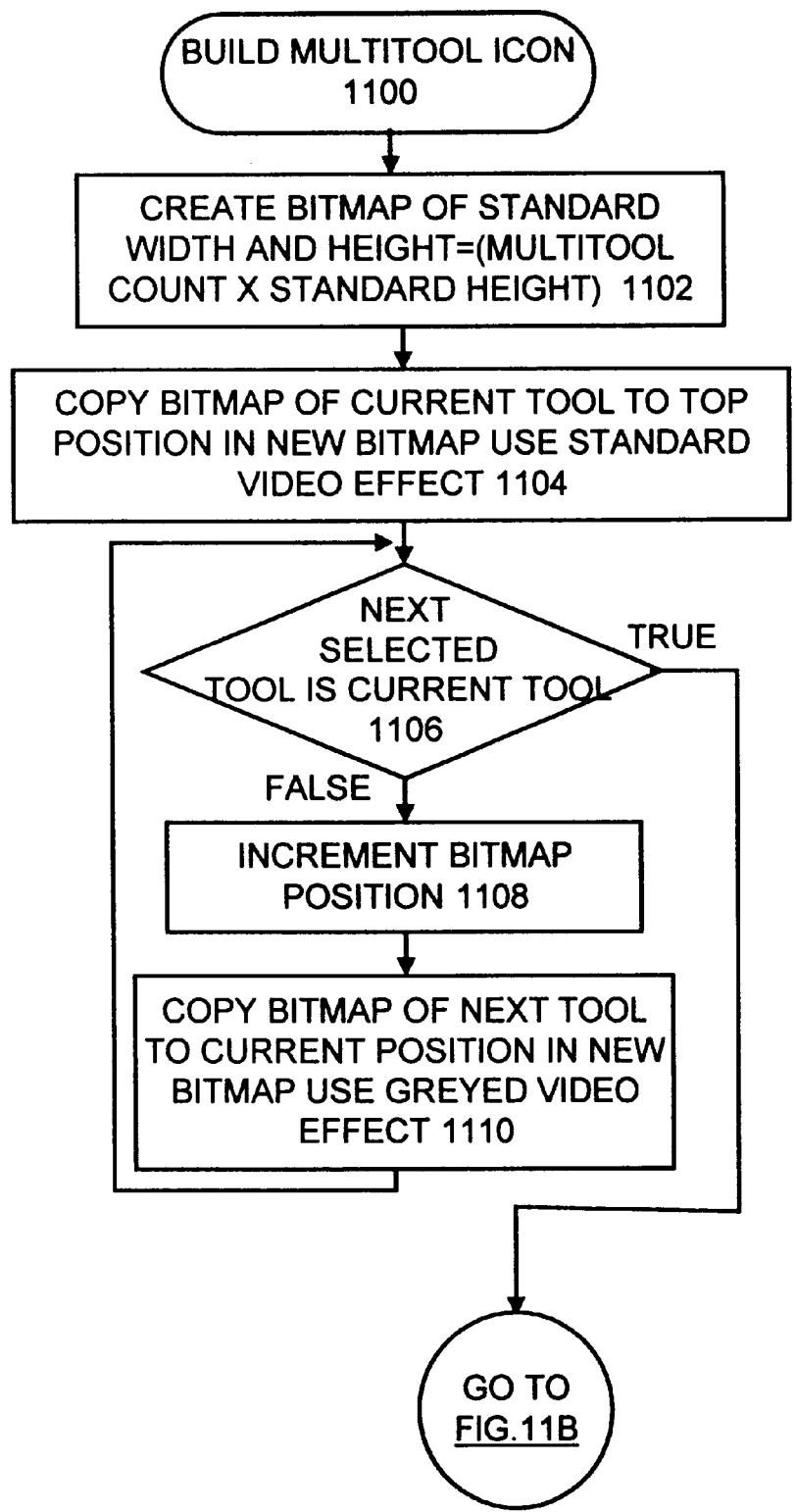
FIGS. 11A and 11B together provide a flow chart illustrating operations for a build multitool icon routine in accordance with the method and computer program product of the preferred embodiment.
Figure 11B:
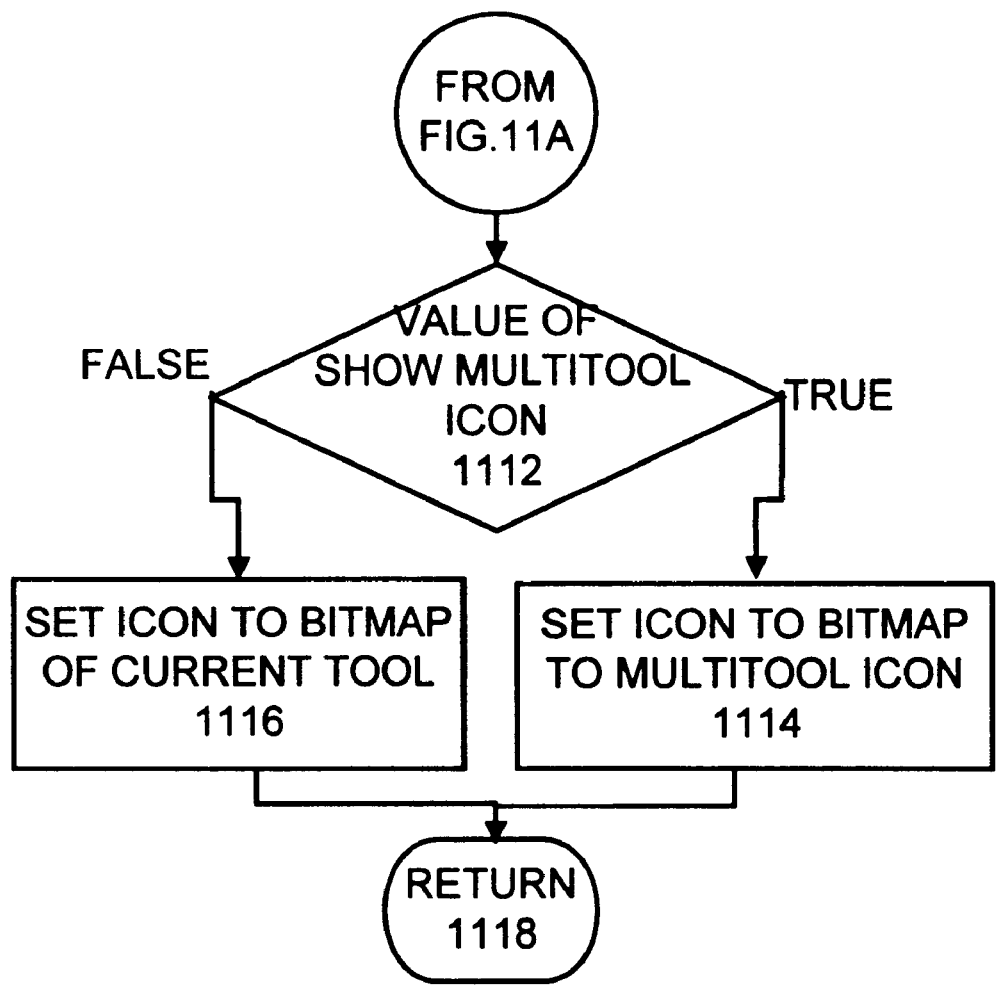
Figure 12A:
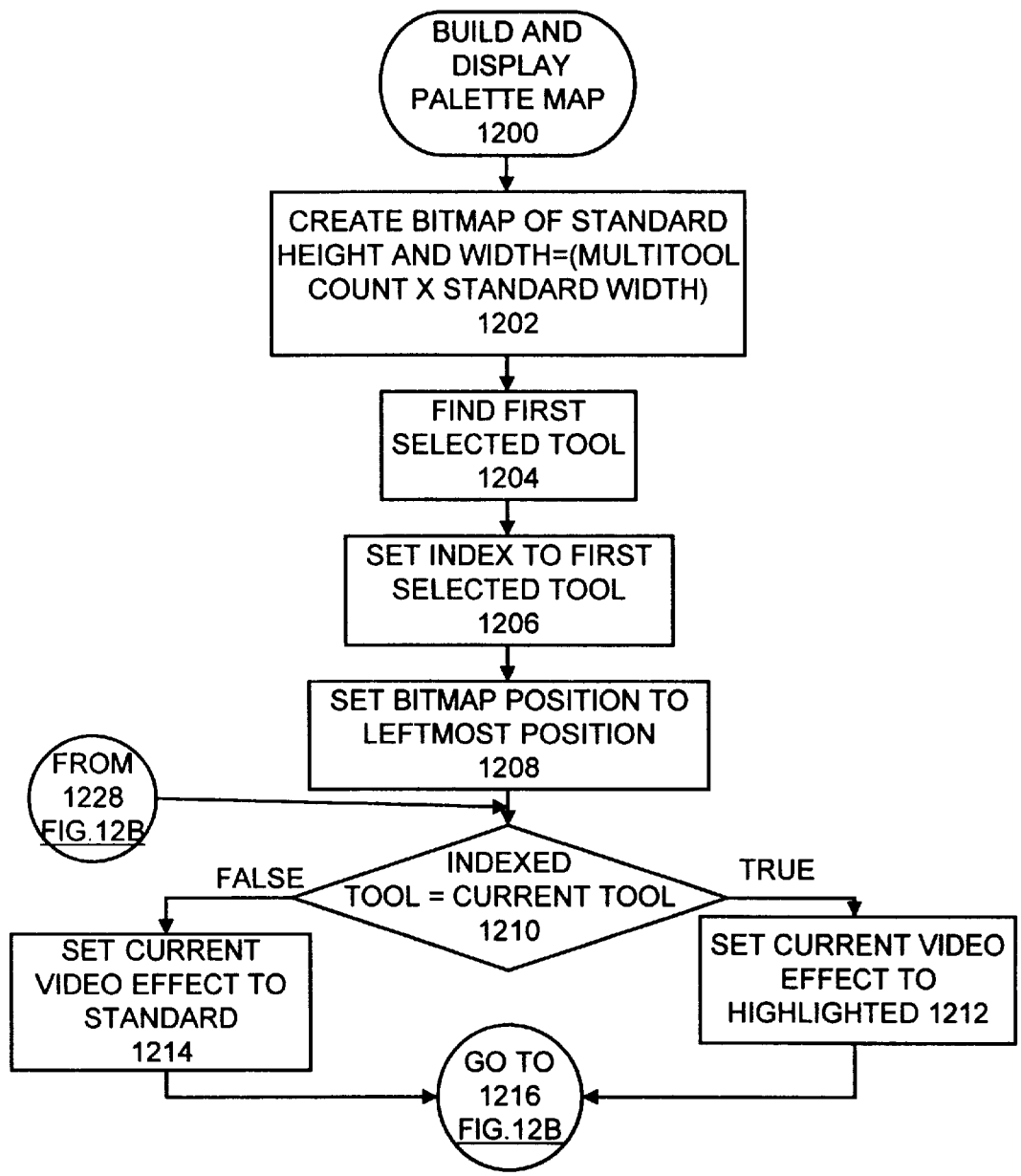
FIGS. 12A and 12B together provide a flow chart illustrating operations for a build and display a palette map routine in accordance with the method and computer program product of the preferred embodiment.
Figure 12B:
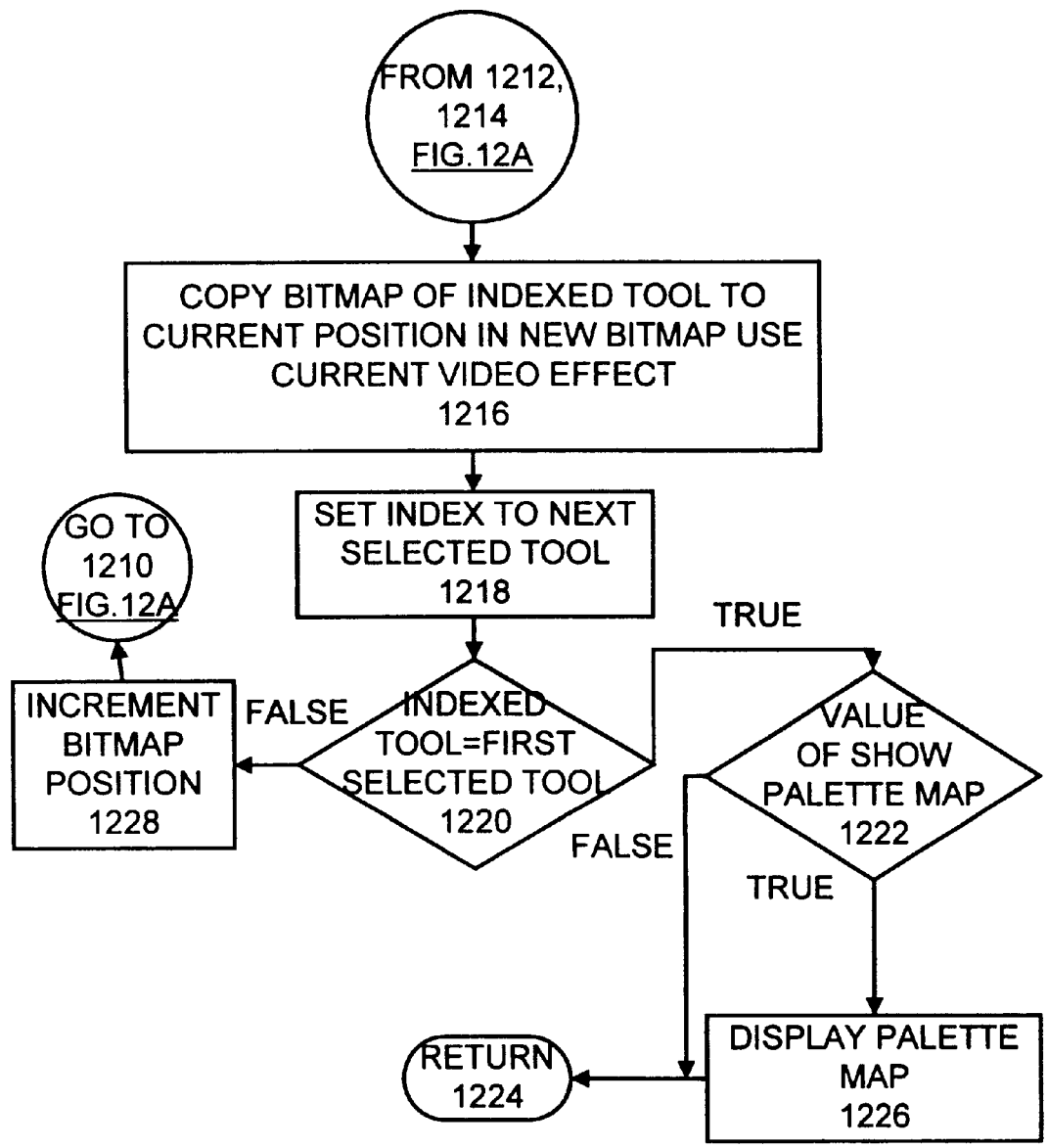

Referring to FIG. 4B, an action of next selected tool entered by a user is identified as indicated at a decision block 412. In the preferred embodiment, this action is a predefined global keystroke operated by the user to switch between tools 204. The current tool is set to the index 310 of the next selected tool 302 in the tool box list 118A using a circular or wrapping search as indicated at a block 414. A build multitool icon routine illustrated and described with respect to FIGS. 11A and 11B, is performed as indicated at a block 416. A build and display palette map routine illustrated and described with respect to FIGS. 12A and 12B, is performed as indicated at a block 418. An action of previous selected tool entered by a user is identified as indicated at a decision block 420. In the preferred embodiment, this action is a predefined global keystroke operated by the user. The current tool is set to the index 310 of the previous selected tool 302 in the tool box list 118A using a circular search as indicated at a block 422. The build multitool icon routine is performed as indicated at a block 424. The build and display palette map routine is performed as indicated at a block 426.

Figure 8:
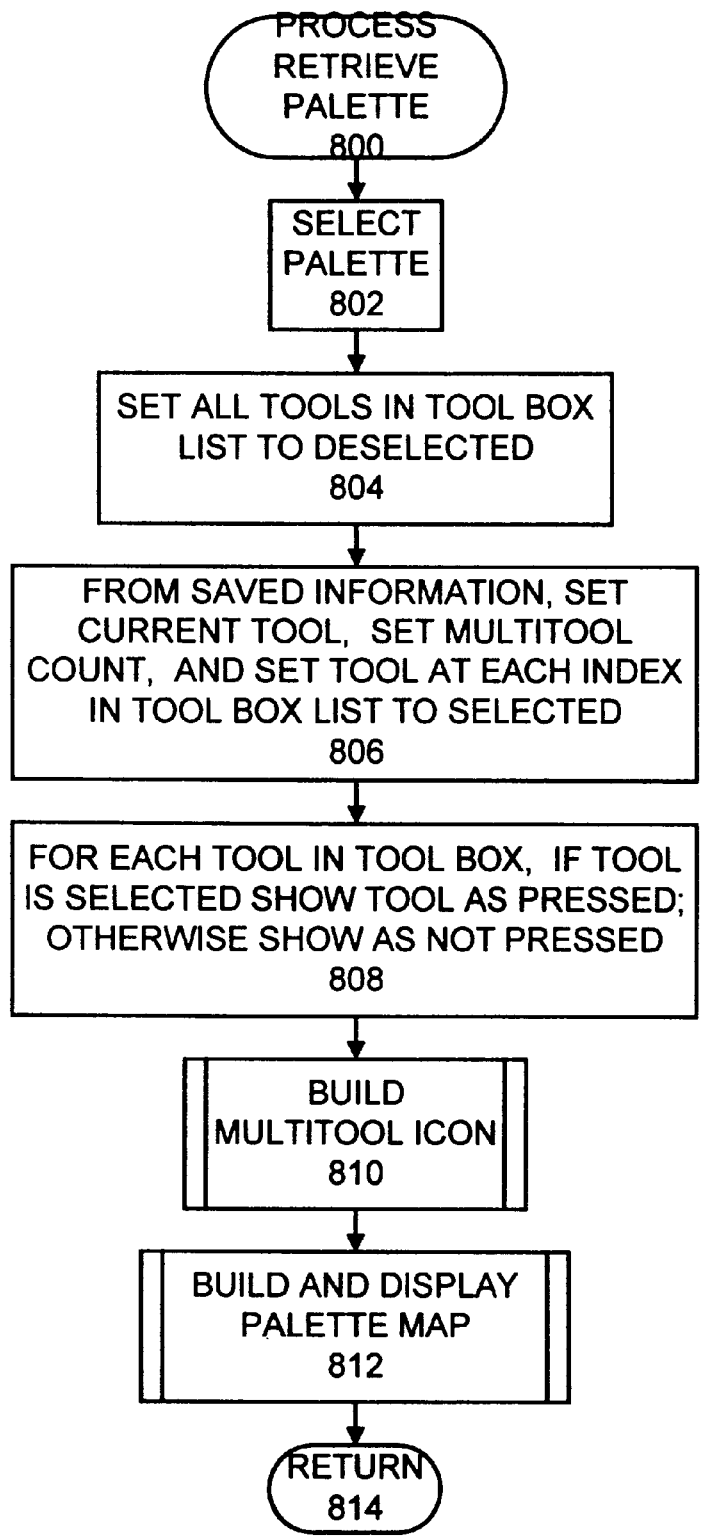
FIG. 8 is a flow chart illustrating operations for a process retrieve palette routine in accordance with the method and computer program product of the preferred embodiment.

Referring to FIG. 4C, an action of save palette entered by a user is identified as indicated at a decision block 428. Then the user is prompted to input a name for the palette as indicated at a block 430. Then the current tool, multitool count, a list of indexes 310 of selected tools 302 and tool IDs 302 are saved as indicated at a block 432. An action of retrieve palette entered by a user is identified as indicated at a decision block 434. A process retrieve palette routine illustrated and described with respect to FIG. 8 is performed as indicated at a block 436. An action of selection from palette map entered by a user is identified as indicated at a decision block 438. The current tool is set to the tool box index of the selected tool in the palette map 114C as indicated at a block 440. The palette map selected tool position, n, is used to find the nth selected tool in the tool box list. The build multitool icon routine is performed as indicated at a block 442. The build and display palette map routine is performed as indicated at a block 444. Then the sequential operation continues with the sequential steps shown in FIG. 5.

Figure 5:
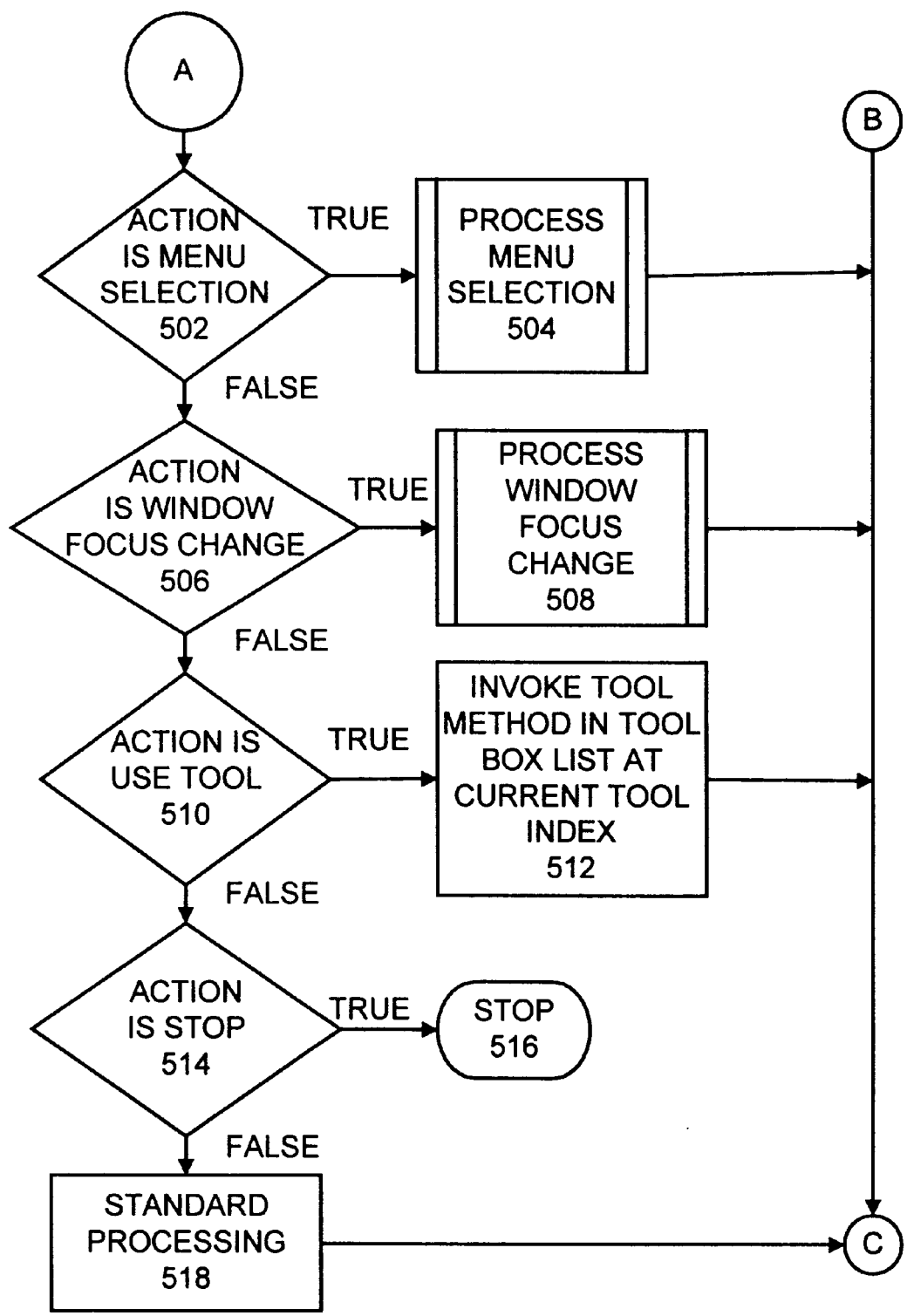
FIG. 5 is a flow chart illustrating continuing operations from FIGS. 4A, 4B, and 4C in accordance with the method and computer program product of the preferred embodiment.
Figure 9:
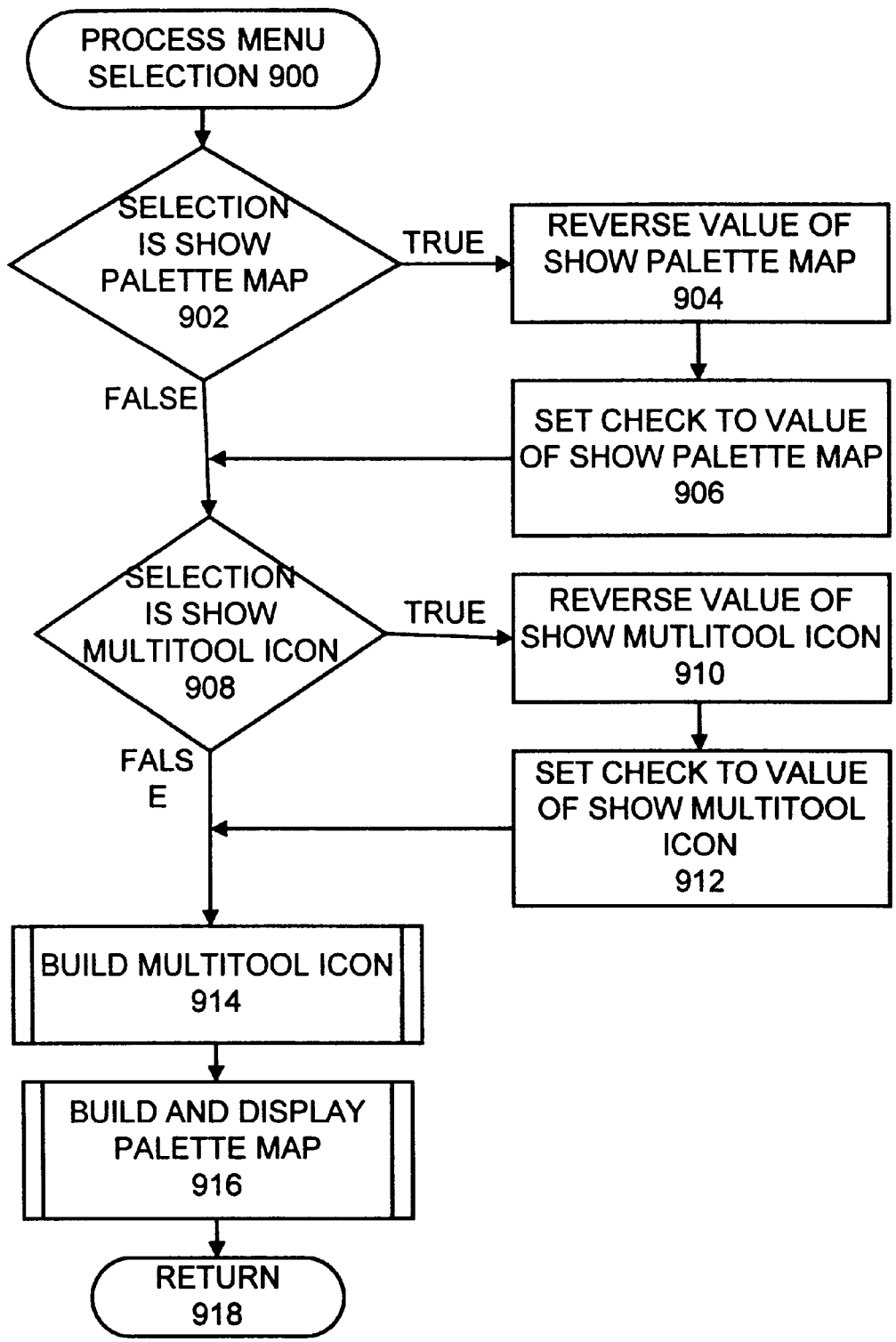
FIG. 9 is a flow chart illustrating operations for a process menu selection routine in accordance with the method and computer program product of the preferred embodiment.
Figure 10:
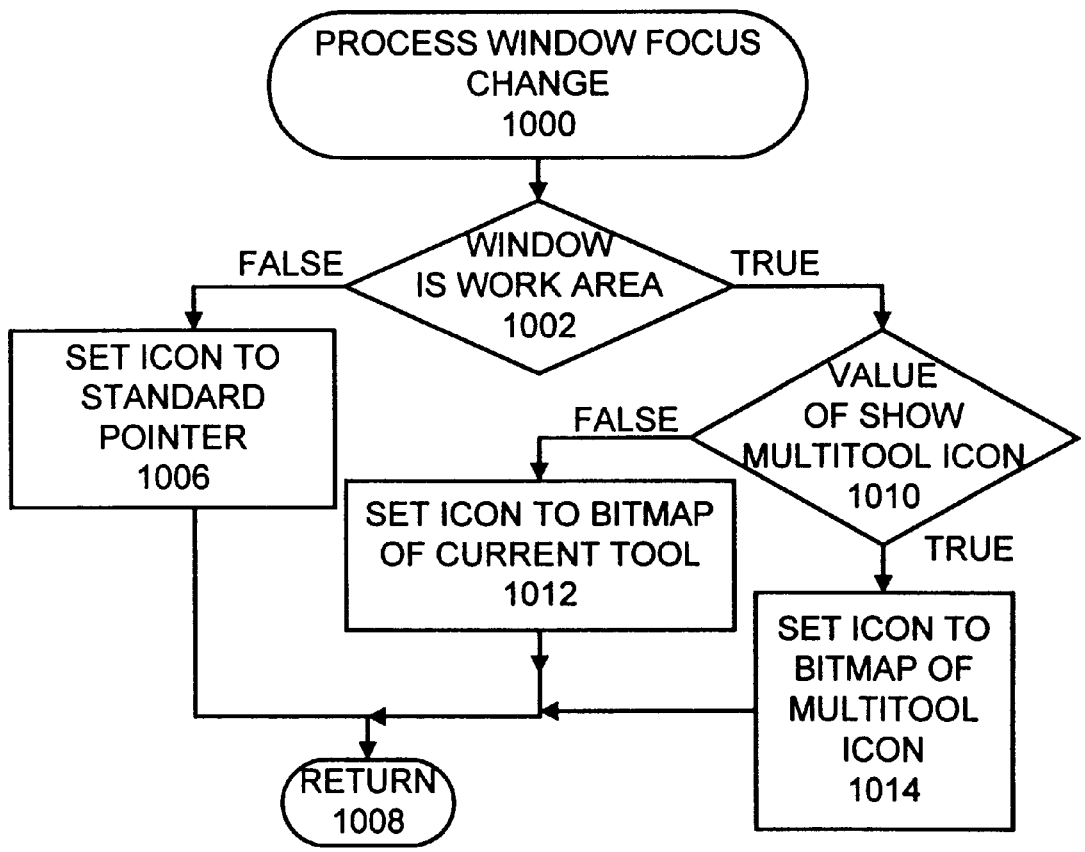
FIG. 10 is a flow chart illustrating operations for a process window focus change routine in accordance with the method and computer program product of the preferred embodiment.

Referring to FIG. 5, a flow chart is provided illustrating continuing operations from FIGS. 4A, 4B, and 4C in accordance with a method and multitool program 114A of the preferred embodiment. An action of menu selection entered by a user is identified as indicated at a decision block 502. A process menu selection routine illustrated and described with respect to FIG. 9 is performed as indicated at a block 504. An action of window focus change caused by the user is identified as indicated at a decision block 506. A process window focus change routine illustrated and described with respect to FIG. 10 is performed as indicated at a block 504. An action of use tool by a user is identified as indicated at a decision block 510. The tool method pointer 306 to the address of the tool method in the tool box list 118A for the current tool index 310 is invoked as indicated at a block 512. An action of stop entered by a user is identified as indicated at a decision block 514. This ends the sequential operations as indicated at a block 516 labeled STOP. Otherwise, when no action is identified at any of the decision blocks 404, 408, 412, 420, 428, 434, 438, 502, 506, 510, 514 in FIGS. 4A, 4B, 4C and 5, standard processing operations are performed as indicated at a block 518. After processing a respective routine or action at one of the blocks 406, 410, 418, 426, 432, 436, 444, 504, 508, 512 in FIGS. 4A, 4B, 4C and 5, then the sequential operations return to block 404 in FIG. 4A following entry point C and the sequential operations are repeated to identify a next user selection.

In FIG. 6, there is shown a flow chart illustrating sequential operations for the process select tool routine starting at block 600 in accordance with the a method and multitool program 114A of the preferred embodiment. A particular selected tool 302 is set to selected or true at selected 308 in the tool box list 118A as indicated at a block 602. The tool 302 is shown or displayed as pressed as indicated at a block 604. The current tool is set to the index 310 of the selected tool 302 in the tool box list 118A as indicated at a block 606. Then the multitool count is incremented as indicated at a block 608. The build multitool icon routine is performed as indicated at a block 610. Then the build and display palette map routine is performed as indicated at a block 612. Then the sequential operations return as indicated at a block 614.

In FIGS. 7A and 7B, there is shown a flow chart illustrating operations for the process deselect tool routine starting at a block 700 in accordance with the method and multitool program 114A of the preferred embodiment. A particular selected tool 302 is set to deselected or false at selected 308 in the tool box list 118A as indicated at a block 702. The tool 302 is shown or displayed as not pressed as indicated at a block 704. Then the multitool count is decremented as indicated at a block 706. Next it is determined whether the multitool count is greater than zero as indicated at a decision block 708.

Referring to FIG. 7B, when the multitool count is not greater than zero, then the sequential operations continue following entry point A in FIG. 7B. Then the current tool is set to the index 310 of a default tool selection as indicated at a block 710. Then the current tool is set as selected as indicated at a block 712. The multitool count is set to one as indicated at a block 714 and the current tool is shown as pressed as indicated at a block 716. If true or the multitool count is greater than zero, then the sequential operations continue following entry point B in FIG. 7B. Then the current tool is set to the index of the next selected tool in the tool box list 118A as indicated at a block 718. The build multitool icon routine is performed as indicated at a block 720. Then the build and display palette map routine is performed as indicated at a block 722. Then the sequential operations return as indicated at a block 724.

FIG. 8 is a flow chart illustrating operations for the process retrieve palette routine starting at block 800 in accordance with a method and multitool program 114A of the preferred embodiment. The palette to be retrieved is selected as indicated at a block 802. All tools 302 in the tool box list 118A are set to deselected as indicated at a block 804. Then from the saved information, the current tool, and the multitool count are set and the selected tools at each index 310 are set to selected as indicated at a block 806. Each of the selected tools in the tool box list 118A are shown as pressed and the other tools 302 not selected are shown as not pressed as indicated at a block 808. The build multitool icon routine is performed as indicated at a block 810. Then the build and display palette map routine is performed as indicated at a block 812. Then the sequential operations return as indicated at a block 814.

In FIG. 9, there is shown a flow chart illustrating operations for the process menu selection routine starting at block 900 in accordance with a method and multitool program 114A of the preferred embodiment. Checking for a selection of show palette map is performed as indicated at a decision block 902. If true, then the value of the show palette map is reversed as indicated at a block 904. Then the value of the show palette map is set check as indicated at a block 906. Otherwise if show palette map not selected at decision block 902 or after the value of the show palette map is checked at block 906, then checking for a selection of show multitool icon is performed as indicated at a decision block 908. If true, then the value of the show multitool icon is reversed as indicated at a block 910. Then the value of the multitool icon is set check as indicated at a block 912. The build multitool icon routine is performed as indicated at a block 914. Then the build and display palette map routine is performed as indicated at a block 916. Then the sequential operations return as indicated at a block 918.

In FIG. 10, there is shown a flow chart illustrating operations for the process window focus change routing starting at block 1000 in accordance with a method and multitool program 114A of the preferred embodiment. Checking whether the window is the work area 210 is performed as indicated at a decision block 1004. If the window is not the work area 210, then the icon is set to the standard pointer as indicated at a block 1006 and the sequential operations return as indicated at a block 1008. Otherwise when the window is the work area 210, then the user entered optional value of the show multitool icon at 206 in FIG. 2 is checked. If the value of the show multitool icon at 206 is not selected, then the icon is set to the bitmap of the current tool as indicated at a block 1012. Otherwise when the value of the show multitool icon at 206 is selected, then the icon is set to the bitmap 304 of the multitool icon as indicated at a block 1014. Then the sequential operations return as indicated at block 1008.

In FIGS. 11A and 11B, there is shown a flow chart illustrating operations for the build multitool icon routine starting at block 1100 in accordance with a method and multitool program 114A of the preferred embodiment. A bitmap of a predetermined standard width and height equal to the multitool count multiplied by a standard height is created as indicated at a block 1102. The bitmap of the current tool is copied to a top position in the created bitmap using standard video effect as indicated at a block 1104. Checking whether a next selected tool is the current tool 302 is performed as indicated at a decision block 1106. If a next selected tool is not the current tool, then the bitmap position is incremented as indicated at a block 1108. A bitmap for the next selected tool is copied to the current position in the created bitmap using greyed video effect as indicated at a block 1110. Then checking whether a next selected tool is the current tool 302 is performed at decision block 1106 and the sequential operations are repeated until determined that the next selected tool is the current tool at block 1106.

Referring to FIG. 11B, the sequential operations continue with checking the value of show multitool icon at 206 in FIG. 2, as indicated at a decision block 1112. If show multitool icon at 206 is selected, then the icon is set to the bitmap 304 of the multitool icon as indicated at a block 1114. Otherwise if show multitool icon at 206 is not selected, then the icon is set to the current tool as indicated at a block 1116. Then the sequential operations return as indicated at a block 1118.

In FIGS. 12A and 12B, there is shown a flow chart illustrating operations for the build and display palette map routine starting at block 1200 in accordance with the method and multitool program 114A of the preferred embodiment. A bitmap of a predetermined standard height and width equal to the multitool count multiplied by a standard height is created as indicated at a block 1202. Then a first selected tool is found as indicated at a block 1204. A local index is set to the first selected tool as indicated at a block 1206. Then the bitmap position is set to a predetermined leftmost position as indicated at a block 1208. The indexed tool is compared with the current tool as indicated at a decision block 1210. If the indexed tool equals the current tool, then the current video effect is set to highlighted as indicated at a block 1212. Otherwise if the indexed tool is not equal to the current tool, then the current video effect is set to standard as indicated at a block 1214.

Referring to FIG. 12B, then the bitmap of the indexed tool is copied to the current position in the new bitmap using the current video effect set at block 1212 or 1214 as indicated at a block 1216. Then the index is set to the next selected tool in the tool box list 118A as indicated at a block 1218. The indexed tool is compared with the first selected tool as indicated at a decision block 1220. If the indexed tool equals the first selected tool, then the value of the show palette map at 206 in FIG. 2 is evaluated as indicated at a decision block 1222. If the show palette map is not selected, then the sequential operations return as indicated at a block 1224. If the show palette map is selected, then the palette map is displayed as indicated at a block 1226 and then the sequential operations return as indicated at block 1224. Otherwise, when determined at decision block 1220 the indexed tool is not equal to the first selected tool, then the bitmap position is incremented as indicated at a block 1228 and the sequential operations return to decision block 1210 and are repeated.

Referring now to FIG. 13, an article of manufacture or a computer program product 1300 of the invention is illustrated. The computer program product 1300 includes a recording medium 1302, such as, a floppy disk, a high capacity read only memory in the form of an optically read compact disk or CD-ROM, a tape, a transmission type media such as a digital or analog communications link, or a similar computer program product. Recording medium 1202 stores program means 1304, 1306, 1308, 1310 on the medium 1302 for carrying out the methods of this invention in the system 100 of FIG. 1.

A sequence of program instructions or a logical assembly of one or more interrelated modules defined by the recorded program means 1304, 1306, 1308, 1310, direct the computer 102 to perform the graphical user interface control method of the invention.

While the present invention has been described with reference to the details of the embodiments of the invention shown in the drawing, these details are not intended to limit the scope of the invention as claimed in the appended claims.

What is claimed is:

1. A computer program product for graphical user interface control in a computer system comprising:
   a recording medium;
   means, recorded on the recording medium, for identifying a user selected tool;
   means, recorded on the recording medium, responsive to identifying said user selected tool for building a multitool icon; said multitool icon including a plurality of user selected tools;
   means, recorded on the recording medium, responsive to identifying said user selected tool for building and displaying a palette map; and
   means, recorded on the recording medium, for identifying a predefined user entry for switching between said plurality of user selected tools; said predefined user entry for switching between said plurality of user selected tools comprising a global keystroke.

2. A computer program product for graphical user interface control in a computer system as recited in claim 1 further include means, recorded on the recording medium, for identifying a user optional setting to show said multitool icon, and means responsive to said user optional setting for displaying said multitool icon within a selected display screen area.

3. A computer program product for graphical user interface control in a computer system as recited in claim 2 wherein said means responsive to said user optional setting for displaying said multitool icon within said selected display screen area include means, recorded on the recording medium, for identifying a current selected tool and for highlighting said current selected tool within said multitool icon display.

4. A computer program product for graphical user interface control in a computer system as recited in claim 2 further includes means, recorded on the recording medium, for identifying a current selected tool and for highlighting said current selected tool within said multitool icon display; means, recorded on the recording medium, for identifying other selected tools and for distinguishing said other selected tools from said current selected tool within said multitool icon display; and wherein said predefined user entry for switching between said plurality of user selected tools includes a predefined mouse button entry.

5. A computer program product for graphical user interface control in a computer system as recited in claim 4 wherein said means, recorded on the recording medium, for distinguishing said other selected tools from said current selected tool within said multitool icon display include means for displaying said other selected tools within said multitool icon display with a greyed video effect.

6. A computer program product for graphical user interface control in a computer system as recited in claim 1 include means for displaying a tool box menu area and further include means, recorded on the recording medium, for identifying a user optional setting to show said palette map, and means responsive to said user optional setting for displaying said palette map in a selected display screen area separate from said tool box menu area.

7. A computer program product for graphical user interface control in a computer system as recited in claim 6 wherein said means responsive to said user optional setting for displaying said palette map in said selected display screen area separate from said tool box menu area include means, recorded on the recording medium, for highlighting a current selected tool within said palette map display.

8. A computer program product for graphical user interface control in a computer system as recited in claim 7 include means, recorded on the recording medium, for distinguishing other selected tools from said current selected tool within said palette map display.

9. A computer program product for graphical user interface control in a computer system as recited in claim 1 wherein said multitool icon includes a plurality of tool icons, each of said plurality of tool icons corresponding to an identified user selected tool.

10. A computer program product for graphical user interface control in a computer system as recited in claim 9 wherein said multitool icon includes means for distinguishing one currently in use tool icon from other tool icons of said plurality of tool icons.

11. A computer program product for graphical user interface control in a computer system as recited in claim 1 further include means, recorded on the recording medium, for storing a tool box list for a plurality of available tools.

12. A computer program product for graphical user interface control in a computer system as recited in claim 11 wherein said means, recorded on the recording medium, for storing said tool box list include means, recorded on the recording medium, for storing a tool ID for each of said plurality of available tools, for storing an index number for each said tool ID, and for storing a selected value for each said tool ID.

13. A computer-implemented method for graphical user interface control in a computer system, said method comprising the steps of:

identifying a user selected tool;

building a multitool icon responsive to identifying said user selected tool; said multitool icon including a plurality of user selected tools;

responsive to identifying a predefined user menu selection, displaying said multitool icon within a display screen work area; and identifying a predefined user entry for switching between said plurality of user selected tools; said predefined user entry for switching between said plurality of user selected tools comprising a global keystroke.

14. A computer-implemented method for graphical user interface control in a computer system as recited in claim 13 further includes the steps of identifying a user menu selection and displaying said multitool icon within a display screen work area.

15. A computer-implemented method for graphical user interface control in a computer system as recited in claim 14 further includes the steps of identifying a current selected tool and highlighting said current selected tool within said displayed multitool icon.

16. A computer-implemented method for graphical user interface control in a computer system as recited in claim 15 further includes the steps of identifying other selected tools and distinguishing said other selected tools from said current selected tool within said displayed multitool icon.

17. A computer-implemented method for graphical user interface control in a computer system as recited in claim 13 further includes the steps of storing a tool box list for a plurality of available tools, and wherein said step of identifying said user selected tool includes the steps of identifying a plurality of user selected tools from said stored tool box list, and wherein said multitool icon includes a plurality of tool icons, each of said plurality of tool icons corresponding to an identified user selected tool.

18. A computer-implemented method for graphical user interface control in a computer system as recited in claim 13 further includes the steps of identifying a user menu selection and displaying a palette map in a display screen work area.

19. Apparatus for graphical user interface control in a computer system comprising:

means for identifying a user selected tool;

means responsive to identifying said user selected tool for building a multitool icon; said multitool icon including a plurality of user selected tools; said multitool icon including a corresponding tool icon for each said identified user selected tool;

means responsive to identifying said user selected tool for building and displaying a palette map;

means for identifying a predetermined user selection for displaying said multitool icon within a display screen work area;

means for identifying a current selected tool;

means for distinguishing said identified current selected tool from other selected tools within said displayed multitool icon; and means for identifying a predefined user entry for switching between said plurality of user selected tools; said predefined user entry for switching between said plurality of user selected tools comprising a global keystroke.

* * * * *